F. C. VOGAN.
TROLLEY GUIDE.
APPLICATION FILED NOV. 15, 1909.
965,424.
Patented July 26, 1910.
2 SHEETS—SHEET 1.
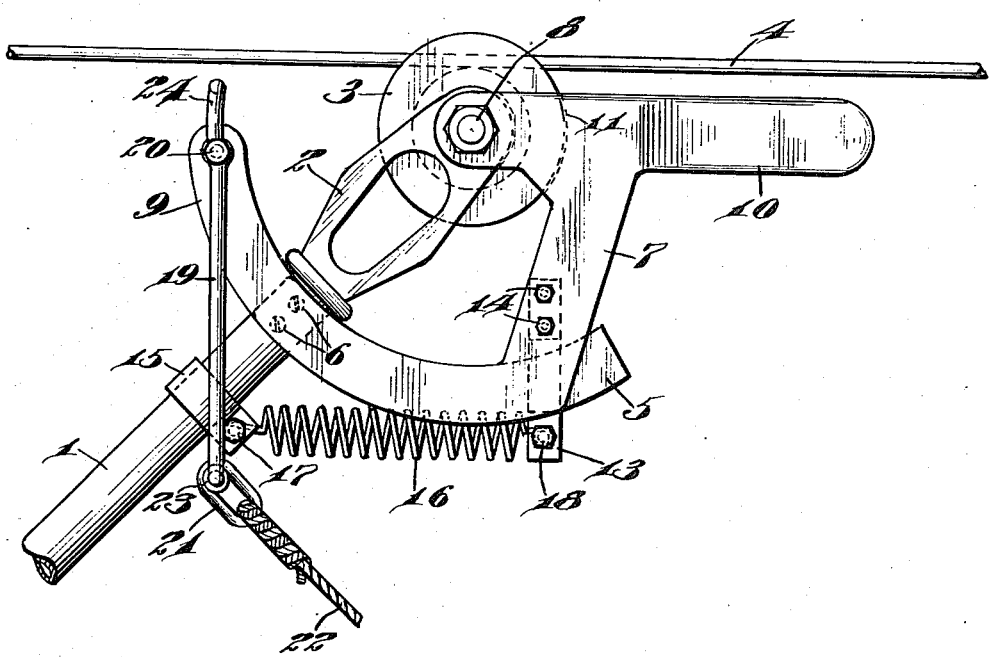
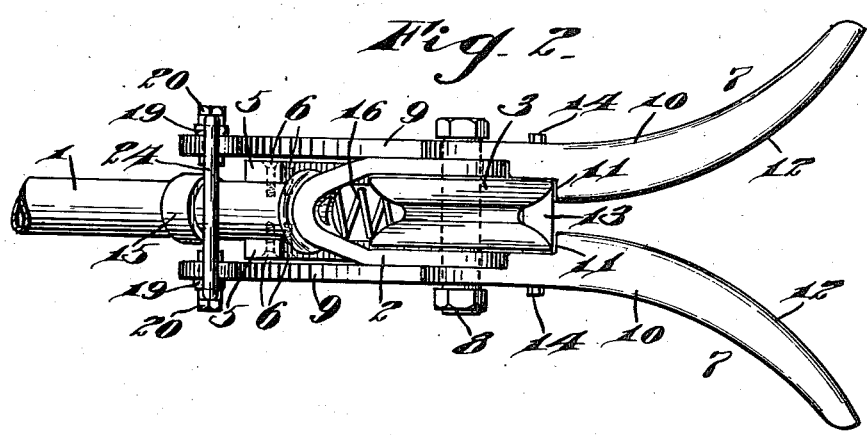
Witnesses
Theo. Rosemann.
R. H. Kunkel.
Inventor
Frank C. Vogan,
By Joshua R. H. Potts,
Attorney F. C. VOGAN.
TROLLEY GUIDE.
APPLICATION FILED NOV. 15, 1909.
965,424.
Patented July 26, 1910.
2 SHEETS—SHEET 2.
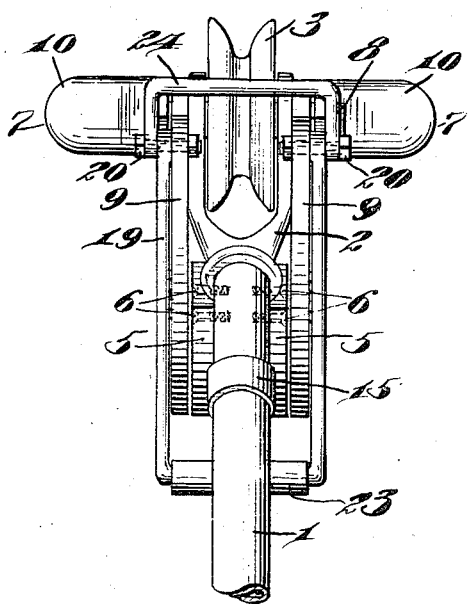
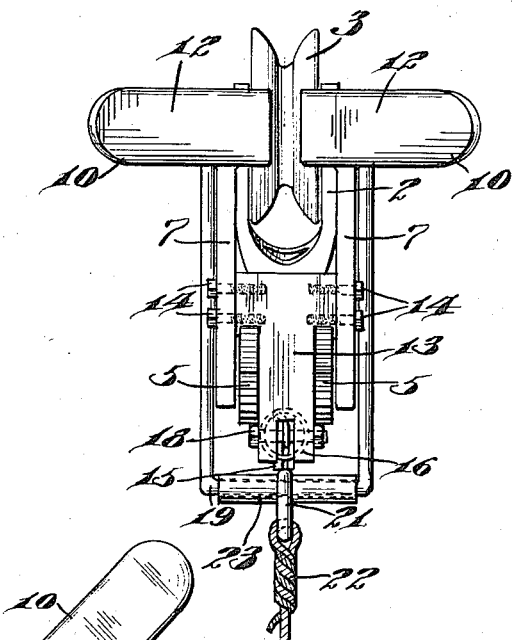
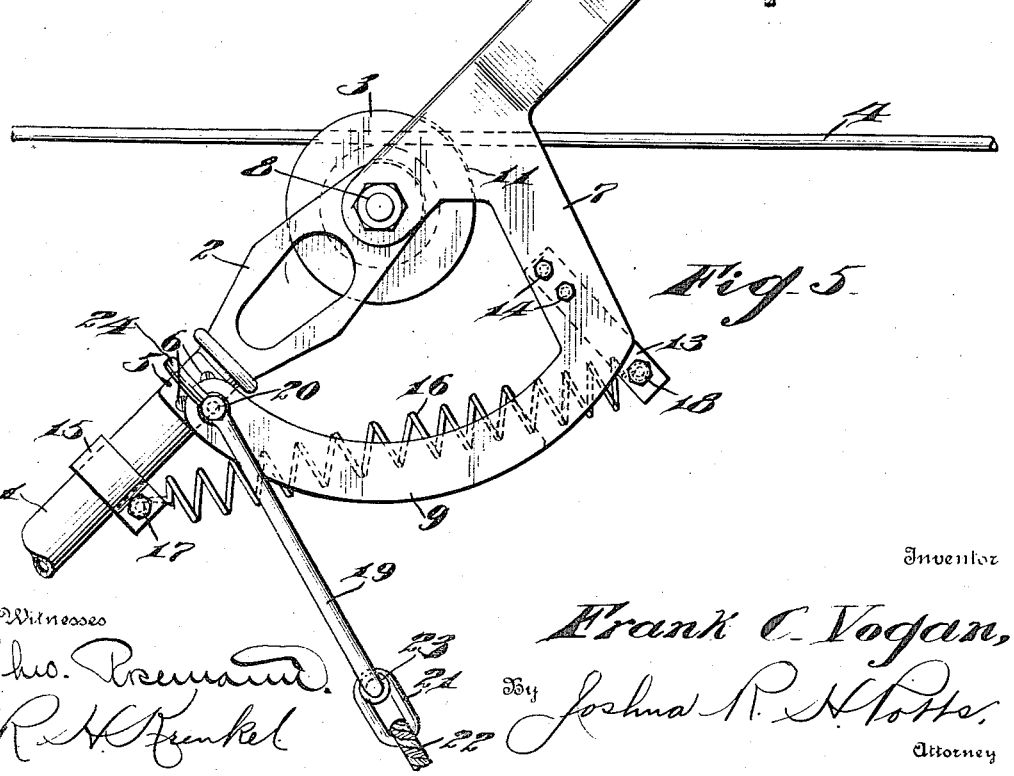
Inventor
Frank C. Vogan,
By Joshua R. H. Potts,
Attorney
Witnesses

UNITED STATES PATENT OFFICE.

FRANK C. VOGAN, OF PHILADELPHIA, PENNSYLVANIA.

TROLLEY-GUIDE.

965,424.

Specification of Letters Patent.

Patented July 26, 1910.

Application filed November 15, 1909. Serial No. 527,992.

*To all whom it may concern:*

Be it known that I, FRANK C. VOGAN, a citizen of the United States, residing at Philadelphia, in the county of Philadelphia and State of Pennsylvania, have invented certain new and useful Improvements in Trolley-Guides, of which the following is a specification.

My invention relates to improvements in trolley guides, the object of the invention being to provide improvements of this character which can be readily attached to any of the well-known forms of trolley, in common use, and which will serve not only to find the wire and direct the wheel onto the wire, but will also serve to prevent the wheel jumping from the wire, when the car is in motion.

With these and other objects in view the invention consists in certain novel features of construction and combinations and arrangements of parts as will be more fully hereinafter described and pointed out in the claims.

In the accompanying drawings, Figure 1, is a view in side elevation, illustrating a normal position of my improvements. Fig. 2, is a top plan view of Fig. 1. Fig. 3, is a front view of Fig. 1. Fig. 4, is a rear view of Fig. 1, and Fig. 5, is a view in side elevation similar to Fig. 1, to show the parts in a different position.

1 represents an ordinary trolley pole, having the ordinary harp 2 secured thereon, and carrying the ordinary trolley wheel 3, adapted to run upon the electric conductor or wire 4.

To opposite sides of the pole 1, curved guide plates 5, are secured by screws or bolts 6, and serve to prevent lateral movement of my improved guide members 7. These guide members 7 are preferably of the peculiar shape shown most clearly in Fig. 1 and as hereinafter described, and are pivotally supported upon the journal bolt 8 of the trolley. These members 7 have curved arms 9, which are curved concentrically with the pivotal point of the members 7 and are adapted to move in parallel with said bars 5 and on the outside of the latter, therefore, serve to prevent lateral movement of the members 7. These members 7 are also provided with laterally or outwardly curved guide members 10, which are recessed as shown at 11 to accommodate the trolley wheel 3, and overlie the edges of the trolley wheel, so that the trolley wire engaging the inner curved or beveled surfaces 12 of the guides 10, will be directed into the groove of the trolley wheel.

13 represents a T-shaped block which is secured by bolts 14, between the members 7—7, and the narrower portion of said block 13 moves between the guide bars 5.

15 represents a clamping collar, which is securely clamped on pole 1, and 16 is a coiled spring which is secured, at one end, by a bolt 17 with collar 15, and at its other end, by a bolt 18 with block 13, and exerts a normal pull on block 13, so as to normally hold the device in positions shown in Figs. 1—2—3— and —4.

To the forward ends of the curved arms 9, a fork 19 is pivotally secured upon bolts 20, and this fork 19 is connected by a link 21 with the ordinary trolley manipulating rope 22, and the latter is secured at some point adjacent the platform of the car, in convenient reach of the conductor. While I have referred to the positions shown in Figs. 1—2—3— and —4, as a normal one, the parts will shift position, in accordance with the elevation of the trolley wire 4, as will now be explained.

It has been found in practice that the trolley wheels leave the wires, most frequently, at points between the cross wires or supports of the conductor, where the tension of the trolley pole serves to force the wire upwardly and hence the trolley wheel is at its highest point midway between the trolley wire supports.

With my improved structure, when the trolley rope 22 is secured, and the trolley wheel moves to a position higher than that shown, the rope will cause the guide arms 10 to pivot upwardly to the position shown in Fig. 5, and as the trolley wheel descends, the pull of the rope against the tension of spring 16 decreases and the spring will return the parts to the position shown in Fig. 1. It will therefore be noted that at the most dangerous point where the trolley is most liable to jump the wire, the guide members 10 will be projected above the wires so as to prevent this jumping, or at least, if the wheel does jump, will guide it back to the wire, and when the trolley reaches the cross wires or supports, where the wires are low, the slack in the rope will permit spring 16 to move the guide members 10 to the position shown in Fig. 1, and prevent any possibility of the guide members striking the cross wires or supports.

When placing the trolley into contact with the trolley wire, the conductor or operator, manipulates the rope 22 and when he holds this rope against the action of the trolley-pole spring, he will move the guide to the position shown in Fig. 5, or to a still more vertical position, so that a wide entrance is provided for the trolley wire 4, and when once between the members 10, the wheel will be guided to the wire.

A sleeve 23 fast to link 21, located on fork 19, prevents lateral movement of the link on the fork, and a bar 24 connecting the bolts 20, engages pole 1 and limits the movement of arms 9 in their rearward and upward movement.

Various slight changes might be made in the general form and arrangement of parts described without departing from my invention, and hence I do not restrict myself to the precise details set forth, but consider myself at liberty to make such changes and alterations as fairly fall within the spirit and scope of the appended claims.

Having thus described my invention, what I claim as new and desire to claim in Letters Patent is:—

1. The combination with a trolley pole and trolley wheel thereon, of curved bars secured at opposite sides of the pole, guide members pivotally supported upon the trolley journal, curved arms on said guide members movable beside and in parallel with said bars, a spring connecting said guide members with said pole, and a trolley operating rope connected with said curved arms.

2. The combination with a trolley pole, a journal thereon and a trolley wheel on said journal, of curved bars secured to opposite sides of said pole, guide members pivotally supported on said journal, curved arms on said guide members movable beside and in parallel with said first mentioned bars, a block secured between said guide members and movable between the curved bars, a coiled spring connecting said block with said pole, and a trolley operating rope connected with said curved arms.

3. The combination with a trolley pole, a harp thereon, a journal in said harp, and a trolley wheel on said journal, curved bars secured to opposite sides of said pole and curved concentrically with said journal, guide members pivotally supported on said journal, curved arms on said guide members movable beside and in parallel with said curved bars, and a trolley operating rope connected with the forward ends of said curved arms.

4. The combination with a trolley pole, a harp thereon, a journal in said harp, and a trolley wheel mounted on said journal, of bars secured to opposite sides of said pole, curved concentrically with said journal, guide members pivotally supported on said journal and having outwardly flaring ends and recessed to receive said trolley wheel, curved arms on said guide members parallel with and positioned outside the said curved bars, a block secured between said members, a clamp on said pole, a coiled spring connected at its ends with said block and with said clamp, a fork straddling the pole and secured at its end to the forward ends of said arms, and a trolley operating rope connected with said fork.

In testimony whereof I have signed my name to this specification in the presence of two subscribing witnesses.

FRANK C. VOGAN.

Witnesses:
S. W. FOSTER,
BEATRICE HERMAN.